(12) United States Patent
Brunner et al.

(10) Patent No.: US 8,969,758 B2
(45) Date of Patent: Mar. 3, 2015

(54) LASER MACHINING APPARATUS AND METHOD FOR FORMING A SURFACE ON AN UNFINISHED PRODUCT

(75) Inventors: Gerhard Brunner, Hägendorf (CH); Urs Hunziker, Wynau (CH); Roland Friederich, Madiswil (CH); Heinrich Mushardt, Börnsen (DE)

(73) Assignee: Ewag AG, Etziken (CH)

( * ) Notice: Subject to any disclaimer, the term of this patent is extended or adjusted under 35 U.S.C. 154(b) by 774 days.

(21) Appl. No.: 12/925,398

(22) Filed: Oct. 20, 2010

(65) Prior Publication Data

US 2011/0095005 A1 Apr. 28, 2011

(30) Foreign Application Priority Data

Oct. 22, 2009 (DE) .......................... 10 2009 044 316

(51) Int. Cl.
*B23K 26/38* (2014.01)
*B23K 26/36* (2014.01)
*B23K 26/08* (2014.01)

(52) U.S. Cl.
CPC ............. *B23K 26/36* (2013.01); *B23K 26/0823* (2013.01); *B23K 26/083* (2013.01); *B23K 26/0876* (2013.01)
USPC .................................. 219/121.68; 219/121.69

(58) Field of Classification Search
CPC ............. B23K 26/365; B23K 26/4075; B23K 26/4065
USPC ............... 219/121.68, 121.69, 121.7, 121.71, 219/121.72, 121.77, 121.78, 121.81, 219/121.82, 121.85, 69.11, 69.17, 95; 700/159–166; 364/474.01, 474.02, 364/474.08
See application file for complete search history.

(56) References Cited

U.S. PATENT DOCUMENTS

| 5,841,099 A | * | 11/1998 | Owen et al. ............... 219/121.69 |
| 6,930,275 B2 | * | 8/2005 | Yamazaki et al. ........ 219/121.67 |
| 2010/0155381 A1 | * | 6/2010 | Kuhl et al. ................ 219/121.72 |

FOREIGN PATENT DOCUMENTS

| DE | 39 23 356 C1 | | 2/1991 | |
| DE | 299 08 585 U1 | | 9/1999 | |
| DE | 19860585 | * | 7/2000 | ............ B23K 26/08 |
| DE | 10 2007 012 815 A1 | | 9/2008 | |
| DE | 10 2007 014 933 A1 | | 9/2008 | |
| GB | 2 444 037 A | | 5/2008 | |
| WO | WO 2006/038017 A2 | | 4/2006 | |
| WO | WO 2006038017 A2 | * | 4/2006 | ............ B23K 26/40 |
| WO | WO 2008113534 A1 | * | 9/2008 | ......... B23K 26/0626 |

* cited by examiner

*Primary Examiner* — Thien S Tran
(74) *Attorney, Agent, or Firm* — R.S. Lombard; K. Bach (57) ABSTRACT

A method and apparatus for the laser machining of an unfinished object into a cutting tool with a cutting edge and a free surface. A laser generates laser beam impulses which are directed by a redirecting arrangement onto a surface of the unfinished object. An impulse reaches an impact location on the surface of the unfinished object under an inclination angle between the laser beam direction (R) of the impulse and the surface to be formed. The redirecting arrangement is controlled so that the laser beam impulses impact at adjacent impact locations and form a pulse zone. With a positioning arrangement a relative movement between the pulse zone and the unfinished object of predetermined speed is established so that the pulse zone formed by the impact locations moves along the surface of the unfinished object and an ablation layer of a layer thickness (dS) is removed with each contour pass.

17 Claims, 8 Drawing Sheets

LASER MACHINING APPARATUS AND METHOD FOR FORMING A SURFACE ON AN UNFINISHED PRODUCT

CROSS-REFERENCE TO RELATED APPLICATION

This application claims the priority benefits of German Application No. 10 2009 044 316.9-34 filed Oct. 22, 2009.

BACKGROUND OF THE INVENTION

The invention resides in a laser machining apparatus and a method for forming a surface on an unfinished product. In particular, one or several cutting edges, chip surface areas and free surface areas are to be formed on the unfinished product. The surface area to be formed may be for example a chip or open surface. With this manufacture of the surface at the same time the edge, in particular the cutting edge can be formed. In this way from the unfinished product a cutting tool can be made. The unfinished product may also comprise several material layers or several elements attached to one another.

For machining once unfinished products, several ablation methods are known, for example, grinding. The grinding of very hard material, for example, polycrystalline diamond (PKD) or CVD diamond (chemical vapor deposition) has technical as well as economical limits. The laser ablation with the aid of shortly pulsed lasers offers more possibilities to economically machine these materials in order to manufacture for example tools.

The manufacture of high-quality cutting edges however is problematic. In the state of the art, laser systems are known which move along the contour of the unfinished object with the aid of a laser scanner, while the object is arranged stationary with regard to the scanner. Although this permits the laser scanner to operate at high speeds at which the individual laser beam pulses can be moved along the unfinished object, the accuracy achieved in the process does not comply with today's requirements. In addition, the surface areas and edges manufactured in this way deviate from straight lines and rather provide for an uneven, jagged shape.

Furthermore laser machining apparatus are known, wherein the laser is moved relative to the unfinished object via apparatus axes. In this way the accuracy and the quality of the surface areas and of the edges obtained on the unfinished object can be improved, but the ablation rates that can be achieved are small. The reason herefor is that the dynamics and the speed of the machine axes are limited. An increase of the dynamics of the machine axes requires large efforts and expenses which makes the laser machining fixture very expensive.

A method and an arrangement for the laser-machining of an unfinished product are known, for example, from DE 299 08 585 U1. The arrangement includes a laser for generating laser beam impulses via a drive unit, the laser and/or the object support structure are moved in a direction transverse to the optical axis of the laser. The laser beam is moved in the process in several adjacent or overlapping lines over the whole width over the area to be ablated for ablating individual material layers. The material is ablated dot-like at the contract points of the laser beam impulses. In order to achieve a continuous material ablation the contact dots overlap by 5 to 25%. In connection with pulsed lasers having a very high frequency correspondingly large advancing speeds are therefore necessary. As already pointed out the ablation rate is small in this procedure and the working times are correspondingly long.

WO 2006/038017 A2 discloses two different embodiments of a laser machining arrangement. In the first embodiment, using a laser scanner, an impulse area is formed from several adjacent impact points of the laser beam impulse. The material ablation occurs at the impact locations of the laser beam impulses of the impulse area. In a second embodiment no real ablation is provided but the unfinished product is cut apart. First the unfinished product is pierced. After the piercing, an advancement movement is initiated for cutting the unfinished product without interruption. This corresponds to the earlier described variants of the laser machining.

DE 10 2007 012 815 A1 discloses a method wherein the impact locations of the laser beam impulses are selected along a pattern by means of a scanner. Additionally, a one or two dimensional relative movement between the pattern of the impact points and the unfinished product may be executed. This superimposed relative movement is to be faster then the path movement of the laser impulses along the scanner path. How such a fast superimposed movement can be generated is not disclosed. The machine axes known in the art are not capable of accomplishing this.

It is the object of the present invention to provide a method and a laser machining apparatus by which the formation of accurate surface area and edge pattern can be established in an economical manner.

SUMMARY OF THE INVENTION

The invention concerns a method and an apparatus for the laser machining of an unfinished object (27). The unfinished object (27) is to be formed into a cutting tool with a cutting edge (60) and a free surface (62). A laser is provided which generates laser beam impulses (24) which are directed by a redirecting arrangement (23) onto a surface (26) of the unfinished object (27). A laser beam impulse (24) reaches at an impact location the surface (26) of the unfinished object (27) under an inclination angle between the laser beam direction (R) of the laser beam impulse (24) and the surface (62) to be formed on the unfinished object (27). The redirecting arrangement (23) is controlled in such a way that the laser beam impulses (24) impact at adjacent impact locations on form and form a pulse zone (55). With the positioning arrangement a relative movement between the pulse zone (55) and the unfinished object of predetermined speed is established so that the pulse zone (55) formed by the impact locations moves along the surface (26) of the unfinished object (27) and an ablation layer of a layer thickness (dS) is removed with each contour pass.

In accordance with the invention a pulsed laser is used which generates laser beam impulses at a predetermined frequency. Via a deflection arrangement the laser beams impulses are directed onto a multitude of impact locations on the surface of an object in a predetermined order. These predetermined impact locations form a two-dimensional pulse area on the surface of the unfinished object. Viewed at a right angle to the pulse surface, the impact locations are disposed side-by-side in two spatial directions. In this way, a sequence of laser beam impulses is generated which are directed onto predetermined impact locations on the pulse surface which differ from one another. This sequence is repeated multiple times in a predetermined order. At the same time a continuous relative movement between the unfinished object and the pulse area is established. The relative movement occurs without standstill of the pulse area on the surface of the unfinished object. If for example, with a reversal of the direction of movement short stand-still phases of the relative movement do occur, the pulse area is during such stand-still phases outside the surface area of the unfinished product. As soon as even a section of the pulse area reaches the surface of the unfinished object the relative movement continues without stand-still. A positioning arrangement moves the unfinished object and/or the deflection arrangement, possibly together with the laser in a relative movement direction along the edge or surface area to be generated. In the process, the pulse area moves together with the speed determined by the positioning arrangement for the relative movement along the surface of the unfinished object. This results in a material ablation in the pulse area which is moved relative to the unfinished object like a tool. As a result, on one hand a high ablation rate is achieved and, on the other hand, in this way very exact edge- or surface areas with little inaccuracies or deviations from the desired contour can be provided. The present invention combines the two alternatively employed laser machining procedures. The rapid scanner optic is used to form the pulse surface. The scanner optic positions the laser impulses in the process not along the desired contour of the surface area or the edge to be formed but it diverts the laser beam impulses onto the impact areas of the pulse surface. The concurrent relative movement of the pulse surface with respect to the unfinished object above the machine axes ensures the desired accuracy for obtaining edge and area configurations with little deviations from the predetermined pattern.

Preferably, the positioning device adjusts at least at certain times an inclination angle of a value greater than zero between the radiation direction of the laser beam impulses and an area to be formed on the unfinished product. The laser beam impulse extends preferably at a right angle to the relative movement direction. The pulse area is oriented transverse to the surface area to be generated. Since the laser beam impulses are oriented at an inclination angle relative to the surface area to be generated, an additional open space is generated during material ablation whereby the removal of the plasma in the ablation area is improved. At the beginning of the process the inclination angle may be zero. It is increased when a predetermined state of the method has been reached during manufacture.

Preferably lasers which are pulsed at a frequency between 1 and 10 MHz are used.

The adjustment of the inclination angle may depend for example on the material of the unfinished object to be machined. The inclination angle may assume values in the range of 0° and 45°, preferably in the range of 5° to 25°. By means of the positioning arrangement the inclination angle may also be changed while the unfinished object is machined and adjusted to a desired value. In particular, if the unfinished object consists of several layers of different materials and if the material to be machined changes during machining the inclination angle can be changed and adapted to one appropriate for the respective material.

The pulse area may have an essentially rectangular contour. The impact locations forming the pulse area are arranged within a rectangular contour in side-by-side relationship so that several of the craters formed by the laser beam impulses at the impact locations meet the rectangle contour. Expressed in another way, the outer impact locations of the pulse area are arranged along the circumference of the rectangular pulse area. Instead of a rectangular pulse area other pulse areas such as polygonal, elliptical or circular or annular pulse areas may be provided. The form of the pulse area may be adapted to the desired material ablation and the desired contour of the finished object to be formed from the unfinished object.

The re-directing arrangement directs the laser beam impulses preferably onto impact areas which are arranged along a predetermined pulse path. The pulse path depends on the shape of the pulse area and is preferably meander-shaped or of spiral shape. Herein the pulse path may have a particular impact location as a starting point and another impact location as an end point wherein the end point is arranged at the edge of the pulse area assigned to the contour to be formed. The path end section of the pulse path including the end point extends preferably parallel or tangential to the direction of the relative movement. With a reset movement from the end point to the starting point a relative a large adjustment path is involved which is substantially larger than the other reset distances between subsequent impact locations along the pulse path. Since the accuracy of the positioning of the laser beam impulses by the redirecting arrangement is limited and the redirecting arrangement tends to over-act, the movement direction of the reset movement is directed away from the edge and/or area to be formed. In this way qualitative impairments of the contour to be produced can be avoided.

The distance between two subsequent impact locations along the pulse path can be provided as desired, in particular by a selection or setting of the impulse frequency of the laser and by the adjustment speed of the redirecting arrangement.

Two subsequent laser beam impulses may be directed to different impact locations on the pulse area. Alternatively, an impulse sequence including two or more laser beam impulses may be directed to the same impact location and only the next impulse sequence may be directed to a different impulse location. The energy of an individual impulse or of an impulse sequence directed to a particular impact location is predetermined and is distributed according to the number of the impulses used. The larger the number of laser impulses included in an impulse sequence the smaller is the energy included in an individual laser beam impulse.

The material parts of the unfinished object which cover the surface area to be generated and which have to be ablated are removed preferably in layers which extend essentially parallel to the pulse surface area. The thickness of the ablation layer-in the radiation direction of the laser impulses depends on the impulse frequency of the laser and the relative speed of the pulse area with respect to the unfinished object. Layer thicknesses of several hundredths of a millimeter can be achieved. The ablation layers extend transverse ahead of the area to be formed. The unfinished object can be formed for example into a cutting tool with at least one cutting edge. To this end, the unfinished object includes preferably a cutting material layer or a cutting material element which is arranged on a carrier layer or a carrier element. The material part to be ablated extends over both layers. The positioning arrangement can adjust a first inclination angle for the ablation of the material of the cutting material layer and a second inclination angle for the ablation of the material of the carrier layer. In this way optimal ablation rates can be provided depending on the material to be ablated and, after the ablation of each ablation layer the focus position of the laser beam impulse can be adjusted by the focusing lens or the focusing arrangement.

It is also possible to determine additional operating parameters depending on the particular material. For example, the intensity of the laser impulse during ablation of the material of the cutting material layer may be different from the intensity during the ablation of the material of the carrier layer. In this way deviations between the desired course of the cutting edge or the area to be formed may be reduced.

BRIEF DESCRIPTION OF THE DRAWINGS

Advantageous features of the invention will become apparent from the following drawings exemplary of the invention, in which.

DETAILED DESCRIPTION OF VARIOUS EMBODIMENTS

Figure 1:
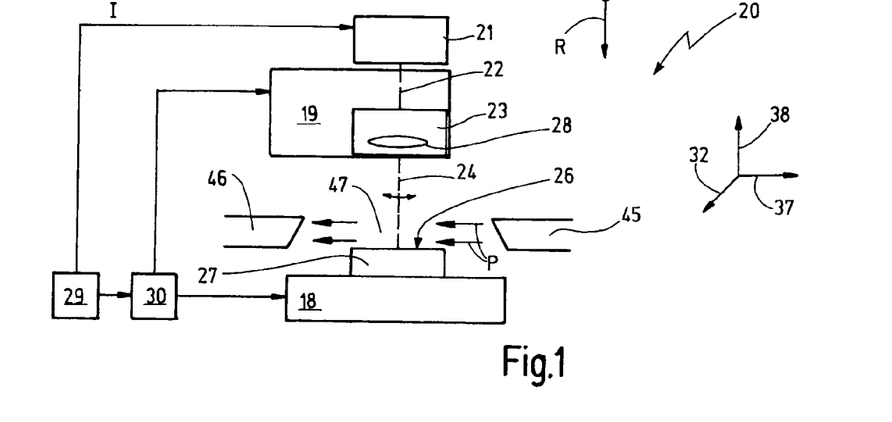
FIG. 1 shows a block diagram of an embodiment of a laser machining arrangement.

FIG. 1 shows schematically a laser machining arrangement 20. The laser machining arrangement 20 includes a pulsed laser 21 which generates a pulsed laser beam 22 and directs it to a laser head 19 with a re-directing arrangement 23. The redirecting arrangement 23 can change the orientation of the laser beam impulses 24 and direct the laser beam pulse 24 onto a predetermined impact area 25 of a surface 26 of an unfinished object 27. The redirecting arrangement 23 may also be called a scanner arrangement. It includes also a focusing optical system 28. The unfinished object 27 is disposed in an accommodation area 47.

The laser machining arrangement 20 also includes a control unit 29 which controls a positioning arrangement 30 by which a relative position between the laser head 19 and the unfinished object can be adjusted and changed. The number of linear axes and axes of rotation of the positioning arrangement 30 may vary. In the preferred embodiment, the positioning arrangement 30 includes a first adjustment device 31 by which the laser head 19 can be moved in a first direction 32. Preferably this is a linear movement in the first direction 32. The first adjustment drive 31 includes for example a first carriage 33 which is linearly slidably supported on a first carriage support structure 34. On the first carriage 33 the laser head 19 is mounted.

Figure 2:
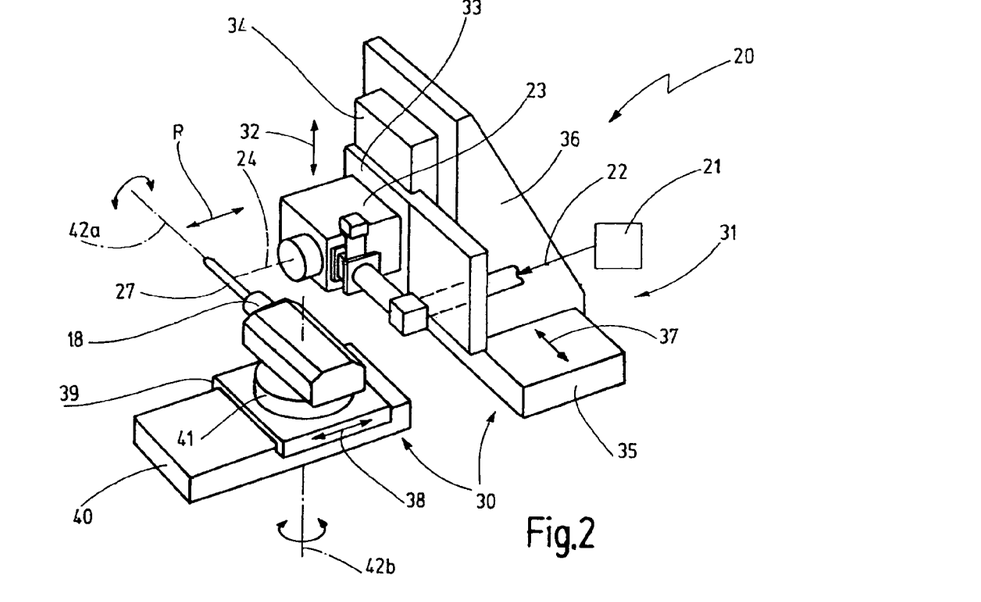
FIG. 2 is a schematic perspective representation of an embodiment of a laser machining arrangement.

For the linear displacement of the object holder 18 or, respectively, the unfinished object 27 as well as the laser head 19 the positioning arrangement 30 may include additional adjustment drives. For example, a second carriage support structure 34 is provided on which a second carriage is slidably supported so as to be guided in a second direction 37. On this second carriage 36 the first carriage support structure 34 is mounted. The second direction 37 extends perpendicularly to the first direction 32. The first and second directions 32, 37 define a plane which extends essentially transverse to a beam emission direction R of the laser beam impulses 24.

A third direction 38 extends at right angles relative to the two other directions 32, 37. A third carriage 39 is supported linearly slidably in this third direction on a third carriage support structure 40. Via this carriage arrangement 39, 40 the work piece or object holder 18 is movable in the third direction whereby the distance of the work piece holder 18 and consequently of the unfinished object 27 from the laser head 19 can be adjusted. The third direction 38 corresponds for example to the radiation direction R. In the embodiment according to FIG. 2 the radiation direction R extends essentially horizontally, but alternatively, it may extend vertically.

The positioning arrangement 30 can therefore cause a relative movement between the laser head 19 and the object holder 18 or respectively, the unfinished object 27 in a relative movement direction V. The relative movement direction V does not need to be spatially constant but may define a path with reference to the three directions 32, 37, 38.

The object holder 18 is arranged on the third carriage 39 via a pivot drive 41 which can execute a pivot movement of the object holder 18 about a first pivot axis 42a and/or a second pivot axis 42b. The first pivot axis 42a extends in the second direction 37 whereas the second pivot axis 42b extends in the first direction 32. With the aid of the pivot drive 41 an angle at which the low beam impulse reaches the unfinished object 27 can be changed and adjusted as desired.

The positioning arrangement 30 may additionally include further adjustment drives or pivot or respectively rotary drives for the adjustment of the relative position between the unfinished object 27 and the laser beam impulse 24. Different from the shown embodiment the laser head may also be stationary and only the object holder 18 for the unfinished object 27 may be designed to be slidably and pivotally supported. For the realization of the positioning arrangement 30 there are many variation possibilities. The relative position to be adjusted by the position adjustment arrangement 30 between the laser head 19 and the object holder 18 is controlled by the control unit 29.

The control unit 29 controls the laser head 19 for adjusting or changing machining parameters before or during the machining of the unfinished object 27. The operating parameters are for example the intensity I of the laser beam impulses and/or the impulse frequency f of the laser 21 in a frequency range of preferably 1 MHz to 10 MHz and/or the focus length of the focusing optical system and similar.

The laser machining arrangement 20 includes a process gas supply line 45 as well as a process gas removal structure 46 which, in the second direction 37 are arranged at opposite sides of the reception area 47, see FIG. 1. In the preferred embodiment a process gas flow P in the second direction 37 is generated in this way. During the machining of the unfinished object 27, the process gas flow P in the area of the surface 26 to be machined can be adjusted so as to remove the plasma generated during the laser ablation by sublimation of the material from machining location.

Figure 14:
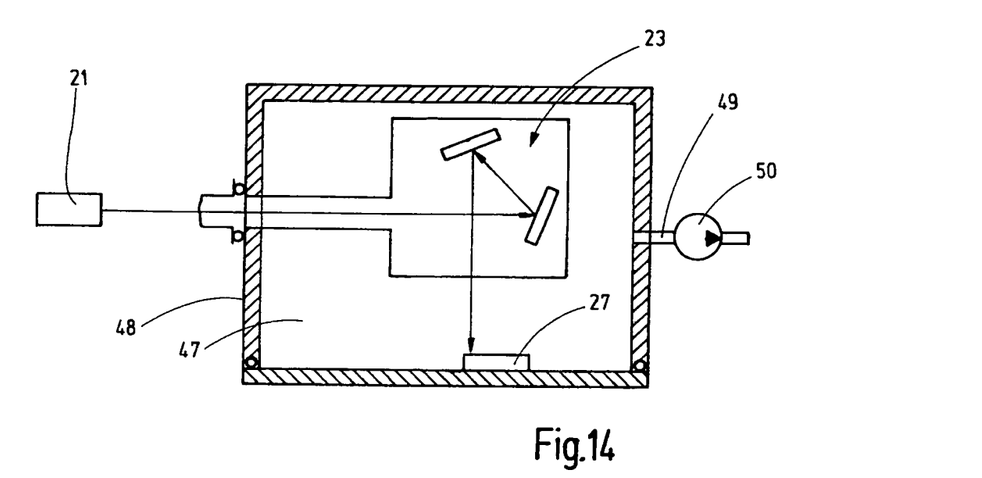
FIG. 14 shows schematically another embodiment of a laser machining arrangement with a vacuum chamber; and, FIG. 15 shows schematically, a modification of the embodiment shown in FIG. 14.
Figure 15:
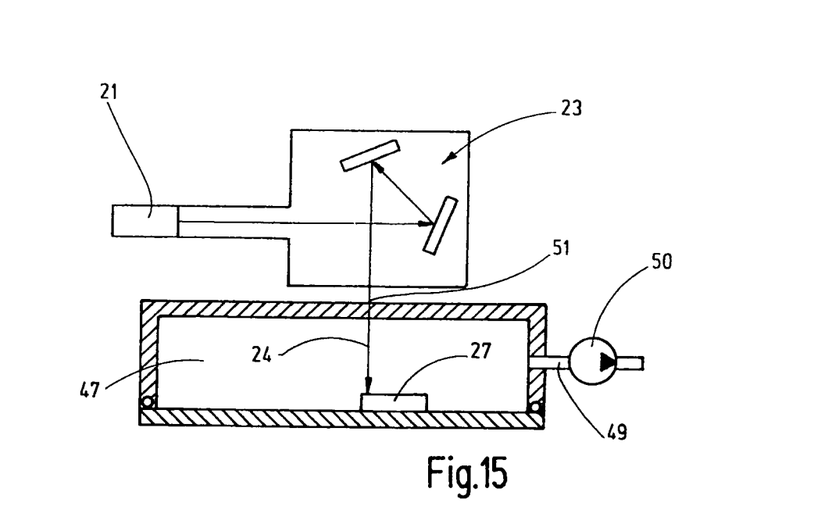

In the embodiments shown in FIGS. 14 and 15 for the establishing of the process gas flow P, alternatively, a vacuum changer 48 is provided in which the object holder 18 and reception area 47 for the unfinished object 27 are arranged. Via a suctioning off-line 49, the vacuum chamber 48 is connected to a vacuum pump 50 so that a controlled vacuum can be generated in the reception area 47. The redirecting arrangement 23 may, in this case, be arranged within the vacuum chamber 48, see FIG. 14 or, alternatively, it may be arranged outside the vacuum chamber 48 as it is shown for example in FIGS. 2 and 15. In this case, the vacuum chamber needs to be transparent to the used laser wave length at least in the entrance area 51 for the laser beam impulses 24.

With the redirecting arrangement 23 the laser beam impulses 24 are directed onto the surface 26 at the unfinished object 27 in the area of a pulse zone 55 thereof. A laser beam impulse 24 impacts on the impact location 25 of the surface 26 and causes there a material ablation whereby a funnel-like crater 56 is formed, as it is shown schematically in FIG. 6. The impact location 26 is considered here to be represented by the center point or, respectively, the center axis of the crater 56. A multitude of predetermined spaced impact locations 25 forms the pulse zone 55.

Figures 3, 4, 5:
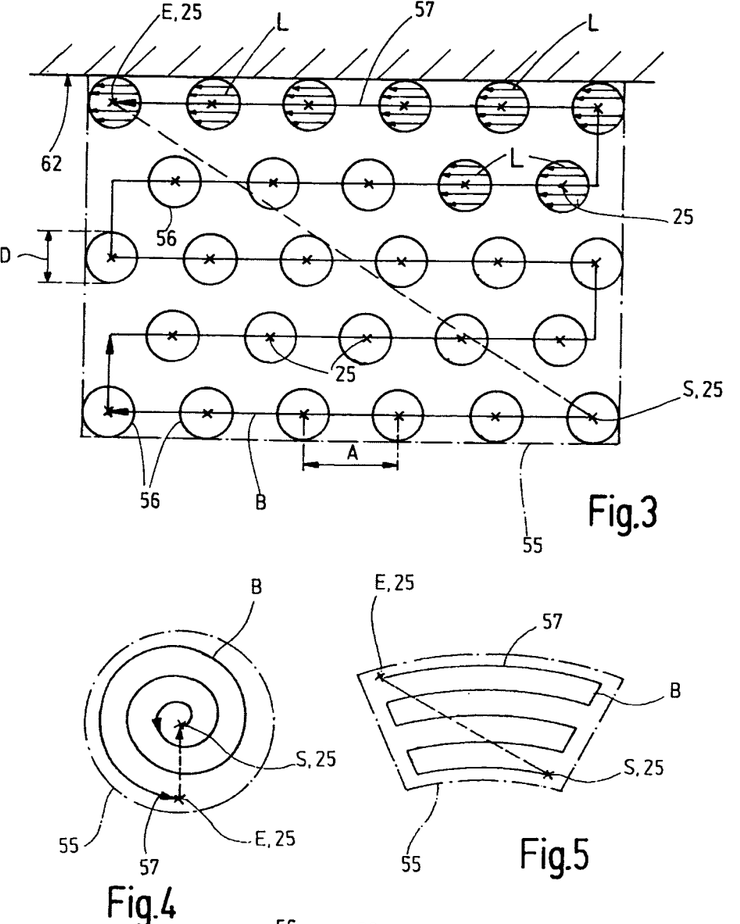
FIGS. 3-5 shows various forms of pulse areas.

The control unit 29 determines for the redirecting arrangement 23 a pulse path B for the arrangement of subsequent impact locations 25. The redirecting arrangement 23 directs laser beam impulses 24 to the subsequent impact locations 25 along the pulse path B. The course of the pulse path B depends on the form of the pulse zone 55 and, for the rectangular pulse zone 55 according to FIG. 3 follows a meander-like path which is composed of straight-line partial courses. An impact location 25 at a corner point of the pulse zone 55 forms a start-out point S which is spaced from the edge 60 or the surface area 62 to be formed. Starting with the start-out point S, the laser beam impulses 24 are placed along the pulse path B up to the impact location 25 in the diagonally opposite corner of the pulse zone, which works the end point E of the pulse path B. The path section 57 of the pulse path B extends for example parallel to the surface area 62 or the edge 60 to be established. This path end section 57 is disposed directly adjacent the surface area 62 or the edge 60 to be produced. Upon reaching the end point E a reverse movement is initiated by the redirecting arrangement 23 and, subsequently the laser beam impulses 24 are then again directed onto the pulse path B starting at the start-out point S. The reverse movement extends away from the contour area 60, 62 to be produced. It is indicated in FIGS. 3 to 5 in each case by a dashed arrow.

The laser light of the laser beam impulse 24 is linearly polarized. The laser 21 and/or the beam guide of the laser light between the laser 21 and the exit location of the laser beam impulse 24 at the laser head 19 is so designed that the polarization direction L of the laser beam impulse 24 has a predetermined orientation with respect to the pulse path B. The orientation is preferably so selected that the polarization direction L and at least a section of the pulse path B extend parallel to each other. The polarization direction extends in particular parallel to the path section 57. The polarization direction L is indicated in FIG. 3 in some craters 56 by arrows disposed in the impact area 25 of the pulse path B.

To influence the polarization direction L with respect to the pulse path B the laser 21 may be rotated around its radiation direction to a desired rotational position. However, not all types of lasers 21 permit any desired positioning. In order to adjust the polarization direction alternatively at least one optical element can be introduced into the beam path of the laser light, which changes the polarization direction between the incoming and exiting laser light, such as for example, a phase-shifting delay plate, in particular a λ/2 plate. The λ/2 plate turns the polarization direction of the laser light by a rotational angle which is twice as large as the incident angle between the polarization direction of the incident light with respect to the optical axis of the λ/2 plate. The polarization direction may also be changed by reflection via one or more redirecting mirrors.

The distance A between two subsequent impact locations 25 along the pulse path B is predetermined by the impulse frequency f of the laser 21 and the adjustment speed of the redirecting arrangement 23. With a change of direction on the pulse path B also the distance may change.

With a pulse zone 55 of a round, or elliptical shape or another curved shape the path section 57 which includes the end point E may also extend tangentially with respect to the contour 60, 62 to be produced (FIG. 4). The pulse path B has in this case a spiral form. The pulse zone 55 may also have the form of a ring segment, as shown in FIG. 5.

Alternatively, for the alignment of this subsequent laser beam impulses 24 along a meander- or serpentine-like path also other pulse paths deposited in the control unit may be selected wherein a sequence all the impact locations 25 defining the pulse zone are passed from the starting point S to the end point E. Preferably, the starting point S and the end point E are, in the direction of the process gas flow P, spaced from each other as far as possible, wherein the process gas flows from the end point E toward the starting point S.

Figure 7:
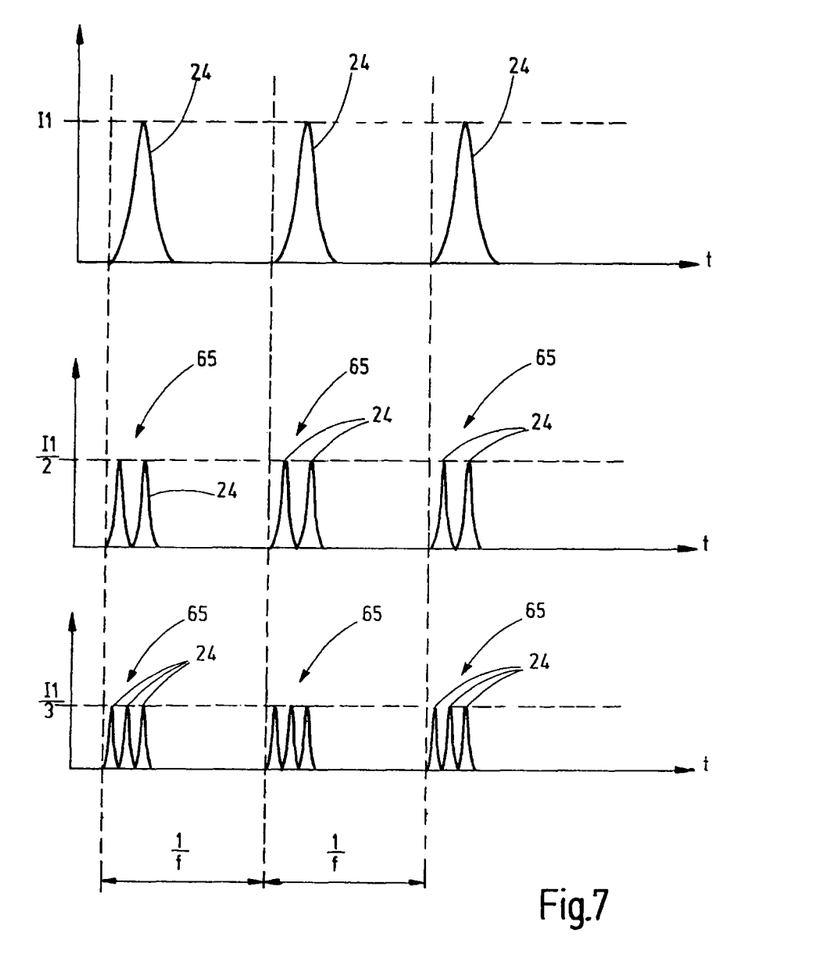
FIG. 7 shows the intensity of laser beam impulses or, respectively, impulse sequences over time.

In the preferred embodiment only one laser beam impulse 24 is directed onto each impact location 25 and the next laser beam impulse is directed onto another impact location 25 of the pulse zone 55. Such a procedure is shown in FIG. 7 in the upper figure part. The time distance between two subsequent impulses 24 is obtainable from the inverse of the actual impulse frequency f of the laser 21. The pulsed laser 21 may be in the form of a picosecond laser or a femtosecond laser.

If subsequent laser beam impulses 24 are directed onto different impact locations 25 these laser beam impulses 24 have the intensity I1. As shown in the two other diagrams of FIG. 7, two or more laser impulses 24 can be directed onto one impact location 25 before the next impact location is addressed. In other words, the redirecting arrangement 23 may direct an impulse sequence 65 of several laser beam impulses 24 onto an impact location 25 before the subsequent impulse sequence 65 is directed onto another impact location 25. The energy which is contained in an impulse sequence 65 and which is effective on an impulse location 25 should correspond to that of a single laser beam impulse 24 with an intensity of I1. This is why the intensity I of an individual laser beam impulse 24 of an impulse sequence 65 is reduced. In the embodiment shown herein the total intensity I of an impulse sequence 65 is constant. Therefore, the intensity I of an individual laser impulse 24 in an impulse sequence 65 corresponds to the quotient of the intensity I1 divided by the number of laser impulses 24 contained in the laser impulse sequence 65.

Figure 6:
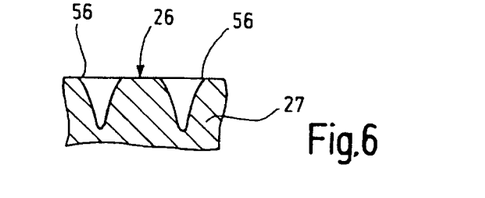
FIG. 6 shows in a cross-sectional view two impact locations.

The diameter D of the crater 56 depends on the effective diameter of the laser impulses 24 at the impact location 25, which can be predetermined by the focusing optical system 28 and which is adjustable in particular also during the machining procedure.

While now via the redirecting arrangement 23 a two-dimensional spatially limited pulse zone 55 is machined, the positioning arrangement 30 at the same time initiates a relative movement of the pulse zone 55 along an edge 60 or a surface area 62 to be formed on the surface 26 of the unfinished object 27. In other words, the material ablation area formed in the pulse area 55 with the multitude of impacts locations 25 of the laser impulses 24 is moved with a predetermined relative speed Vrel in the relative movement direction V along the side of the edge 60 or, respectively, the surface area 62 to be formed. The relative speed Vrel is always greater than zero as long as at least apart of the pulse zone 55 is on the surface 26 of the unfinished object. In this way, on the unfinished product, edges or respectively surfaces with only little deviation from the desired edge or respectively surface contour can be made. This is relevant in particular in the manufacture of a cutting tool which is to be provided with one or more cutting edges 60 which are delimited by a shaving surface 61 and a free surface area 62.

An inclination angle α is adjusted for example by the positioning arrangement 30 and the pivot arrangement 41. The inclination angle α is defined as the angle between the beam direction R of the laser beam impulses 24 and a plane F in which the surface area 62 to be machined out of the unfinished object with regard to the pulse zone 55 is disposed. In connection with a curved surface contour the plane F represents a plane tangential to the actually machined location. The inclination angle α to be adjusted is determined by the control unit 29 and may change during the machining of the unfinished object 27. In order to achieve an optimal ablation rate the inclination angle α is adapted to the material of the unfinished object to be ablated. In connection with unfinished objects 27, which consist of different parts or material layers, in this way an inclination angle α is always provided which is optimally, tuned to the material whereby the processing efficiency is noticeably improved.

Below, various stages in the machining of the unfinished object 27 for forming a cutting edge 60 and a free surface area 62 adjacent the cutting edge 60 will be described with reference to FIGS. 9 to 13.

Figure 9:
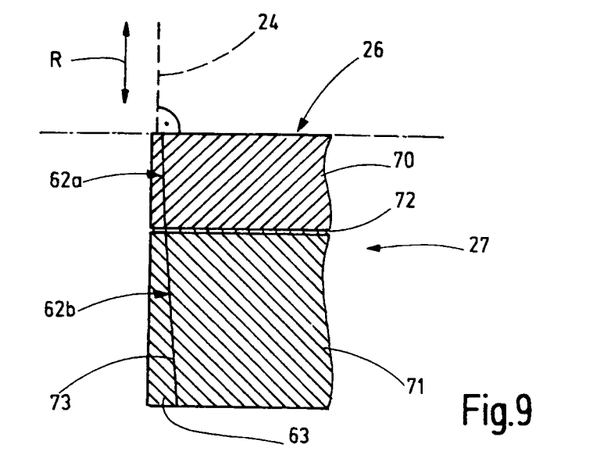
FIGS. 9-13 show schematically in sectional views taken transverse to the direction of the relative movement of the unfinished object at different stages of the machining thereof.

The unfinished object 27 consists of a cutting material layer which is formed by a cutting element 70 and which consists for example of a polycrystalline diamond, PKD, or a CVD diamond. The cutting element 70 is disposed on a carrier element 71 which represents a carrier layer and consists for example of a hard metal. The two elements 70, 71 are firmly interconnected by means of a connecting layer 72, for example, a solder layer. Alternatively, a cutting material layer could also be disposed directly on a carrier layer for example by a procedure such as PVD.

The upper side of the unfinished object 27 forms on the finished object the shavings surface 61 of the cutting tool. Adjacent the shavings surface 61 a free surface area 62 is to be machined out of the unfinished object 27, whose desired contour is shown by the line 73. The wedge angle to be formed is for example 90°. The first free surface section 62a which is disposed adjacent the cutting 60 to be formed extends at a wedge angle with respect to the shavings surface 61. Adjacent the first free surface section 62a a second free surface section 62b is to be disposed which extends with respect to the shavings surface area 61 at an angle which is smaller than the wedge angle. In order to expose the free surface area 62 and consequently also the cutting edge 60, the material part 63 of the unfinished object must be completely removed, which completely covers the free surface area 62 to be formed and comprises parts of the cutting element 70 and of the carrier element 71. The material part 63 includes a side surface area of the unfinished object 27 disposed adjacent the shavings surface 61. Preferably the material part 63 is almost completely sublimated during the ablation so that only a small residual part 64 remains as waste piece. The residual part comprises less than 10% of the volume of the material part 63 and preferably less than 5%.

The laser beam impulses 24 reaching the surface 26 in the area of the pulse zone 55 result in a material ablation. The laser head 19 is moved during the generation of the laser beam impulses 24 in the relative movement direction V, that is in the FIGS. 9 to 13 at a right angle to the image plane, so that the pulse zone 55 is displaced along the surface 26 of the unfinished object 27. The relative speed for this relative movement is several millimeters per minute and is smaller, by several orders of magnitude than the adjustment speed of the redirecting arrangement 23 for the displacement of the impact location 25 along the pulse path B which has an order of magnitude of meters per second. The material ablation occurs layer-by-layer along the free surface area 62 to be formed. With each complete displacement of the pulse zone 55 in the relative movement direction V along the surface area 62 to be formed, which may be designated a contour pass Ki (i=1 . . . n) an ablation layer is removed. The contour pass Ki . . . Kn is repeated n times until the material part 63 is completely removed. The ablation layers have a thickness dS of several hundreds of a millimeter.

Figure 8A:
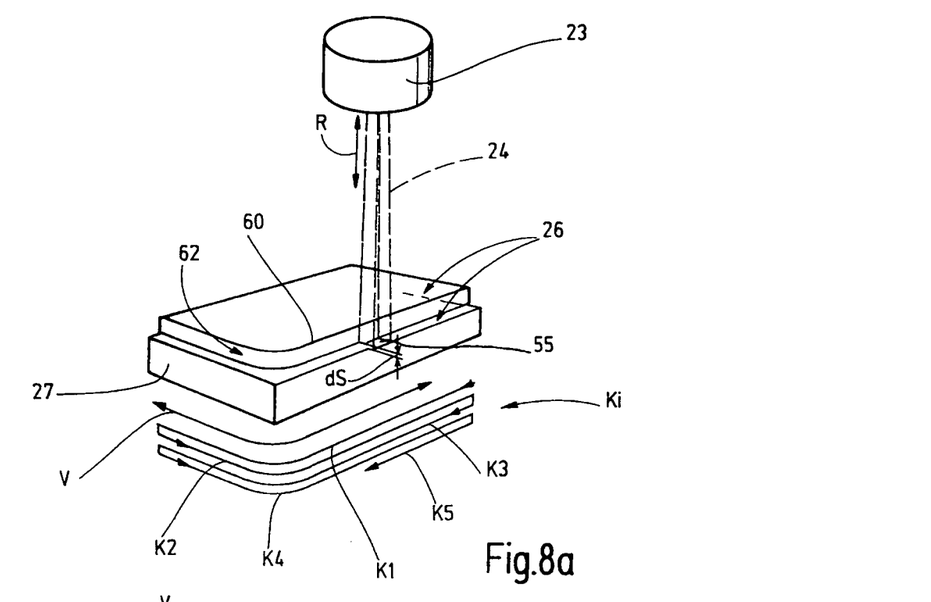
FIG. 8a shows in a perspective view, schematically an unfinished object with a pulse area.
Figure 8B:
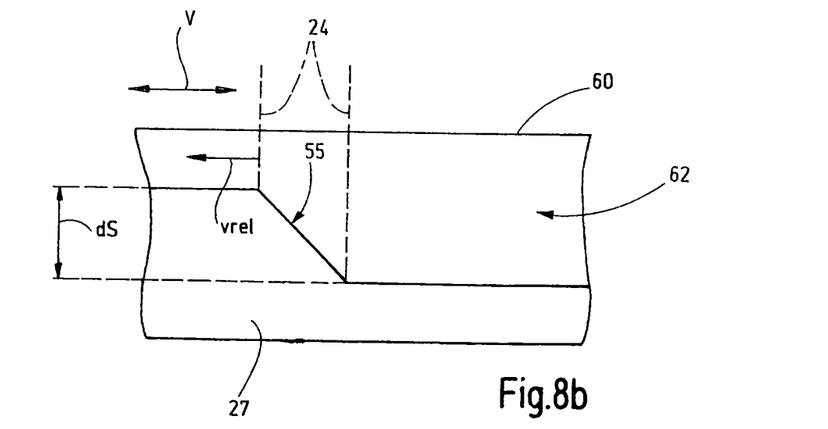
FIG. 8b is a schematic detail representation of the material removal obtained by the relative movement between the pulse area and the unfinished object.

As shown schematically in FIG. 8b, the material ablation depth increases in the area of the pulse zone 55 in a direction opposite to the relative movement of the pulse zone 55 as a result of the relative movement thereof. In the direction of the relative movement V at the rear end of the pulse zone 55, the material ablation depth is greatest and determines the layer thickness dS of the ablation layer because the front area of the pulse zone 55 was already moved over this area of the surface 26 of the unfinished object 27 as a result of its continuous movement. In contrast, the material ablation depth in the surface area at the front end of the pulse zone 55 is still small since this area has just been reached by the pulse zone 55.

After each contour pass Ki (i=i . . . n) the focusing setting of the laser beam impulse 24 is automatically adjusted since the distance of the surface 26 from the laser head 19 has changed by the thickness dS of the ablation layer removed. This is compensated for by an adjustment of the focus setting of the focusing optical system 28 and/or the positioning arrangement 30 after each contour pass Ki (i=i . . . n). The focus setting may also be automatically adapted during the laser beam impulse passage over the pulse zone 55 since—as described above—the material ablation depth increases within the pulse zone 55 in a direction opposite the relative movement direction V so that also the distance between the laser head 19 and the surface 26 of the unfinished object 27 changes within the pulse zone 55.

Figure 10:
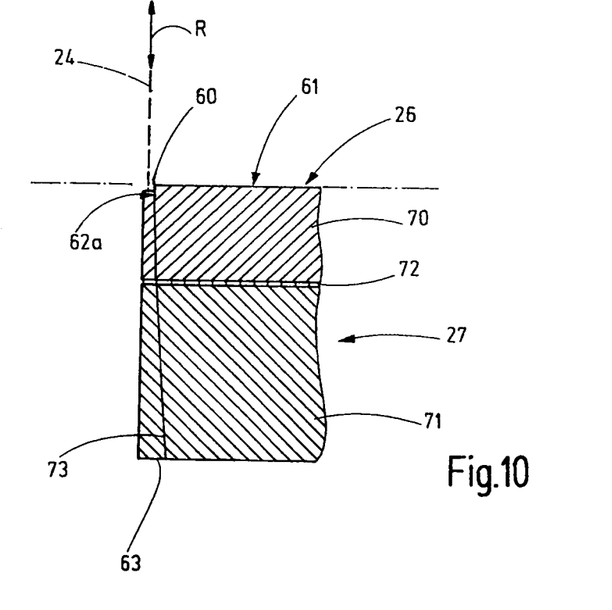

At the beginning of the procedure, as shown in FIGS. 9 and 10, the inclination angle α between the first surface section 62a and the laser beam radiation direction R may be set to be zero and is therefore not designated in FIGS. 9 and 10 and only after the ablation of one or several ablation layers adjacent the cutting edge 60 the angle α may be increased. The inclination angle α may, mathematically, be positive or negative. By the determination of the suitable inclination angle α, the wedge angle and the cutting edge 60 can be made very accurately. Alternatively, however, an inclination angle α different from zero may be set already at the beginning of the procedure.

Figure 11:
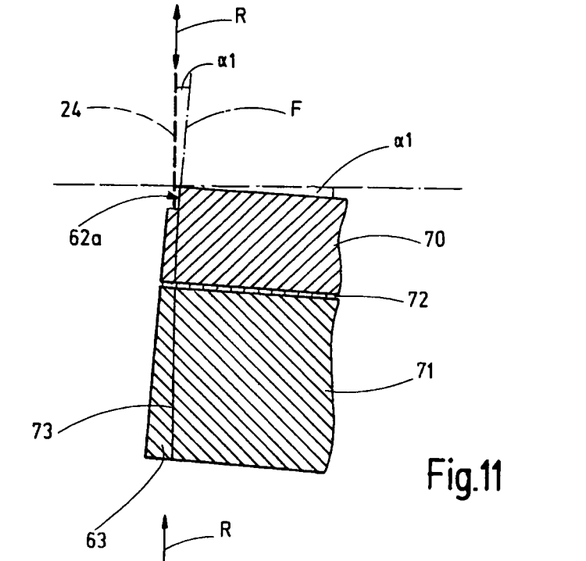
Figure 12:
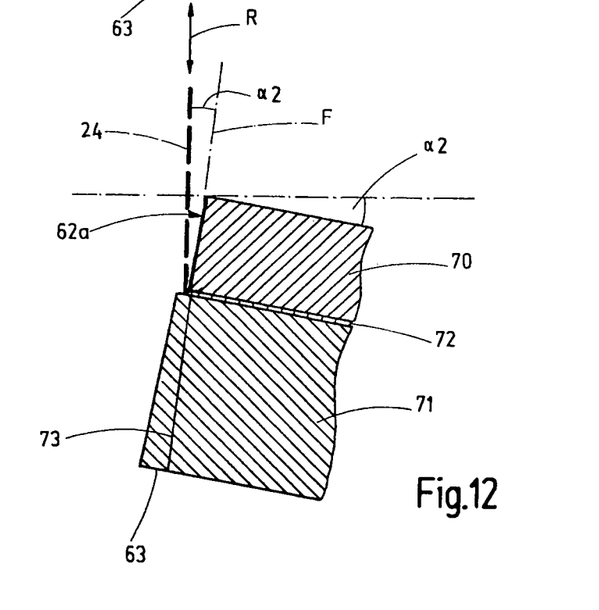
Figure 13:
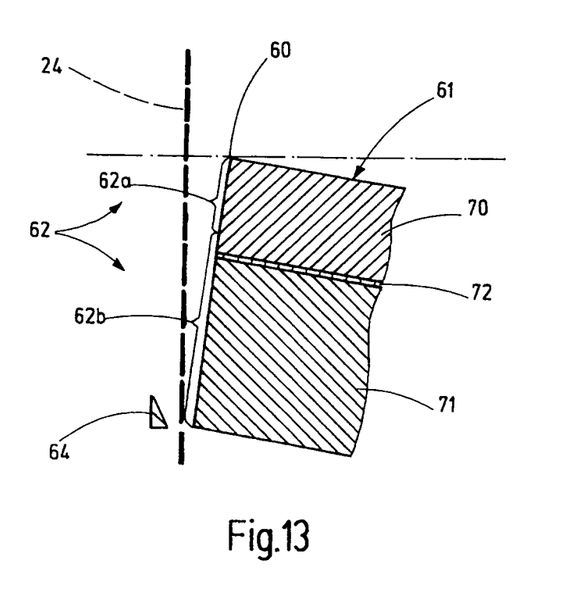

For making this first surface section 62a, as shown in FIG. 11, a first inclination angle α1 of about 5° to 10° is set. The intensity I of the laser beam impulse 24 has first intensity value IK. As soon as a sufficiently large area of the free surface 62 is generated and, as a result, a minimum distance of the pulse zone 55 from the cutting edge 60 has been reached, the intensity of the laser beam impulses 24 can be changed to a second intensity value IG, as shown in FIG. 12, symbolized by a relatively thick dashed line of the laser beam impulses 24, which in the example provided herein, is greater than the first intensity value IK, symbolized in FIG. 11 by a relatively thin dashed line of the laser beam impulses 24: IK<IG.

In the exemplary embodiment, the intensity I is changed to the second intensity value IG when the material part 63 in the area of the cutting element 70 is ablated and the connecting layer 72 has been reached. At this point in time, the control unit 29 initiates a change of the inclination angle α from the first inclination angle α1 to the second inclination angle α2, wherein the second inclination angle α2 is for example greater than the first inclination angle α1. In the exemplary embodiment the second inclination angle α2 for the material ablation of the carrier element 71 is about 10 to 25° as shown in FIG. 12. The inclination angle α is always measured with respect to the free surface section 62a, 62b to be formed. If the free surface area 62 to be formed is angled or curved the positioning arrangement 30 changes the relative position between the laser head 19 and the unfinished object 27 so as to maintain the desired inclination angle α.

The invention concerns a method and an apparatus for the laser machining of an unfinished object 27. The unfinished object 27 in particular is to be formed into a cutting tool with a cutting edge 60 and a free surface area 62. Laser beam impulses 24 are generated by a laser and are directed onto a surface 26 of the unfinished object 27 via a redirecting arrangement 23. A laser beam impulse 24 reaches an impact area 25 under an inclination angle α between the beam direction R of the laser beam impulse 24 and the free surface area 62 to be formed on the unfinished object 27. The inclination angle α can be adapted before and during the material ablation by a positioning arrangement 30 and can be adapted to changing operating parameters. The redirecting arrangement 23 is controlled in such a way that the laser beam impulses 24 impact at impact areas 25 which are disposed in side-by-side relationships. A predetermined number of impact locations 25 forms a pulse zone 55. Onto each impact area 25 of the pulse zone 55 laser beam impulses 24 are directed repeatedly in a predetermined order. Via a positioning arrangement 30 the pulse zone 55 and the unfinished object 27 are moved relative to each other at constant speed, so that the pulse zone 55 formed by the predetermined impact location 25 is moved along the surface 26 of the unfinished object and a layer is ablated with each contour pass. The material ablation generated in the area of the pulse zone 55 moves therefore continuously along the surface 26. In this way very accurate edge and surface contours can be formed in or on the unfinished object 27 with, at the same time, high ablation rates.

Reference Numerals 18 object holder
19 laser head
20 laser machining arrangement
21 pulsed laser
22 laser beam
23 redirecting arrangement
24 laser beam impulse
25 impact area
26 surface of unfinished object
27 unfinished object
28 focusing optical system
29 control unit
30 positioning arrangement
31 first adjustment drive
32 first direction
33 first carriage
34 first carriage support structure
35 second carriage support structure
36 second carriage
37 second direction
38 third direction
39 third carriage
40 third carriage support structure
41 pivot drive
42a first pivot axis
42b second pivot axis
45 process gas supply line
46 process gas removal structure
47 reception area
48 vacuum chamber
49 suctioning off line
50 vacuum pump
51 entrance area
55 pulse zone
56 funnel-like crater
57 path section
60 cutting edge
61 shavings surface
62 free surface area
62a first free surface section
62b second free surface section
63 material part
64 residual part
65 impulse sequence
70 cutting element
71 carrier element
72 connecting layer
73 line
α inclination angle
A distance
B pulse path
D diameter
dS layer thickness
E end point
f impulse frequency
F plane
I intensity
Ki contour pass (i=1 to n)
L polarization direction
P process gas flow
R beam emission direction
S starting point
V relative movement direction
vrel relative speed

What is claimed is:

1. Laser machining apparatus for the manufacture of a contour (60, 62) of an unfinished object (27), comprising:
   a laser (21) providing laser beam impulses (22, 24);
   a redirecting arrangement (23), for directing the laser beam impulses (24) of the laser (21) in a first relative movement at a first predetermined speed along a predetermined cyclical pulse path (B) defining a first relative movement direction parallel to a surface (26) of the unfinished object between a plurality of spaced predetermined impact locations (25) defining a predetermined moving pulse zone (55) having some of the plurality of predetermined impact locations (25) of the cyclical pulse path (B) as outer impact locations (25) along the circumference of the pulse zone (55) and the remainder of the plurality of predetermined impact locations (25) inside the outer impact locations (25) on a portion of the surface (26) of the unfinished object (27) and wherein two of the laser beam impulses (24) may be directed to different impact locations (25) or two or more of the laser beam impulses (24) may be directed to the same impact location (25) and wherein the cyclical pulse path (B) has a starting point (S) and an end point (E) between cycles wherein the impact location (25) marking the end point (E) is arranged at the circumference of the pulse zone (55) which is assigned to an edge (60) or a free surface area (62) to be formed;
   a positioning arrangement (30) for executing a second relative movement between the unfinished object (27) and the predetermined moving pulse zone (55) at a second predetermined speed less than the first predetermined speed in a second relative movement direction (V) independent from the first relative movement and parallel to the surface (26) of the unfinished object (27) along an edge (60) or a surface (62) to be formed;
   wherein a material part (63) of the unfinished object (27) covering the edge (60) or surface (62) to be formed is removed layer by layer in layer ablation passes extending essentially parallel to the pulse zone (55) and wherein the redirecting arrangement (23) as the pulse zone (55) moves across each of the layers to be removed provides a resetting movement between the end point (E) and the starting point (S) of each cyclical pulse path (B) at the end of each cycle thereof as the pulse zone (55) moves across the layer to be removed; and, means for executing the first relative movement along the cyclical pulse path (B) at the first predetermined speed and simultaneously executing the second relative movement between the unfinished object (27) and the predetermined moving pulse zone (55) independent from the first relative movement at the second predetermined speed less than the first predetermined speed and for causing an independent superimposition of the first relative movement with respect to the second relative movement.

2. Laser machining apparatus according to claim 1, wherein the positioning arrangement (30) provides and sets an inclination angle ($\alpha$) between the laser beam direction (R) of the laser beam impulse (24) and a surface (62) to be formed on the unfinished object (27).

3. Laser machining apparatus according to claim 1, wherein the ablation layers extend transverse to the surface (62) to be formed on the unfinished object (27).

4. Laser machining apparatus according to claim 2, wherein the positioning arrangement (30) changes the inclination angle ($\alpha$) during the machining of the unfinished object (27).

5. Laser machining apparatus according to claim 2, wherein the inclination angle ($\alpha$) is predetermined in the positioning arrangement depending on the material of the unfinished object (27).

6. Laser machining apparatus according to claim 2, wherein the unfinished object (27) includes a cutting material layer (70) which is disposed on a carrier layer (71) and a material part (63) to be removed extends over both layers (70, 71), wherein the positioning arrangement (30) adjusts a first inclination angle ($\alpha1$) for the ablation of the material of the cutting material layer (70) and a second inclination angle ($\alpha2$) for the ablation of the material of the carrier layer (71).

7. Laser machining apparatus according to claim 6, wherein an intensity (I) of the laser impulses (24) during the ablation of the material of the cutting material layer (70) differs from the intensity (I) of the laser impulses (24) applied during the ablation of the material of carrier layer (71).

8. Laser machining apparatus according to claim 6, wherein the cutting material layer is provided for the establishment of the cutting edge and the carrier layer (71) for supporting the cutting layer and the two layers are firmly joined.

9. Laser machining apparatus according to claim 2, wherein the inclination angle ($\alpha$) is in the range of 0° to 45°.

10. Laser machining apparatus according to claim 1, wherein the redirecting arrangement (23) directs the laser beam impulses (24) in a predetermined sequence onto the impact areas (25) of the pulse zone (55).

11. Laser machining apparatus according to claim 1, wherein the distance (A) between two subsequent impact locations (25) along the cyclical pulse path (B) is predetermined by an impulse frequency (f) of the laser (21) and the first predetermined speed of the redirecting arrangement (23).

12. Laser machining apparatus according to claim 1, wherein the redirecting arrangement (23) directs two immediately subsequent laser impulses (24) onto different impact locations (25) of the pulse zone (55).

13. Laser machining apparatus according to claim 1, wherein the redirecting arrangement (23) directs two immediately subsequent impulse sequences (65) including at least two laser beam impulses (24) onto different impact locations (25) of the pulse zone (55).

14. Laser machining apparatus according to claim 9, wherein the inclination angle ($\alpha$) is particularly in the range of 5° to 25°.

15. Method for manufacturing a contour (60, 62) on an unfinished object (27), comprising the following steps:

providing the unfinished object (27);

generating laser beam impulses (22, 24) and directing the laser beam impulses (24) at a first predetermined speed in a first relative movement along a predetermined cyclical pulse path (B) defining a first relative movement direction parallel to the surface (26) of the unfinished object (27) between a plurality of impact locations which are disposed in spaced relationship in a moving pulse zone (55) having some of the plurality of predetermined impact locations (25) of the cyclical pulse path (B) as outer impact locations (25) along the circumference of the pulse zone (55) and the remainder of the plurality of predetermined impact locations (25) inside the outer impact locations (25) on a portion of the surface 26 of the unfinished object (27) and wherein two subsequent laser beam impulses (24) may be directed to different impact locations (25) or two or more of the laser beam impulses (24) may be directed to the same impact location (25) and wherein the cyclical pulse path (B) has a starting point (S) and an end point (E) between cycles wherein the impact location (25) marking the end point (E) is arranged at the circumference of the pulse zone (55) which is assigned to an edge (60) or a free surface area (62) to be formed;

executing a second relative movement between the unfinished object (27) and the moving pulse zone (55) at a second predetermined speed less than the first predetermined speed wherein the second relative movement extends in a second relative movement direction (V) along the contour (60, 62) to be formed;

removing in layer by layer in ablation passes extending essentially parallel to the pulse zone (55) the material part (63) of the unfinished object (27) covering the edge (60) or surface (62);

providing a reset movement between the end point (E) and the starting point (S) of each cycle of cyclical pulse path (B) as the pulse zone (55) moves across a layer to be removed;

controlling the first relative movement along the cyclical pulse path (B) at the first predetermined speed and simultaneously controlling the second relative movement between the unfinished object (27) and the moving pulse zone (55) independent from the first relative movement at the second predetermined speed for causing an independent superimposition of the first relative movement with respect to the second relative movement.

16. Laser machining apparatus according to claim 1, wherein the means for executing the first relative movement along the cyclical pulse path (B) at the first predetermined speed and simultaneously executing the second relative movement between the unfinished object (27) and the predetermined pulse zone (55) independent from the first relative movement at the second predetermined speed less than the first predetermined speed and for causing an independent superimposition of the first relative movement with respect to the second relative movement comprises:

a control unit (29) for controlling the redirecting arrangement (23) for executing the first relative movement along the cyclical pulse path (B) at the first predetermined speed and for controlling the positioning arrangement (30) for simultaneously executing the second relative movement between the unfinished object (27) and the predetermined pulse zone (55) independent from the first relative movement at the second predetermined speed less than the first predetermined speed and for causing the independent superimposition of the first relative movement with respect to the second relative movement.

17. Laser machining apparatus according to claim 1, wherein the second predetermined speed of the second relative movement is several orders of magnitude less than the first predetermined speed of the first relative movement.

* * * * *